United States Patent
Zaus

(10) Patent No.: US 8,457,313 B2
(45) Date of Patent: Jun. 4, 2013

(54) PROTOCOL EXPANSION OF A SIGNALING MESSAGE

(75) Inventor: Robert Zaus, München (DE)

(73) Assignee: Siemens Aktiengesellschaft, Munich (DE)

( * ) Notice: Subject to any disclaimer, the term of this patent is extended or adjusted under 35 U.S.C. 154(b) by 1363 days.

(21) Appl. No.: 10/593,406

(22) PCT Filed: Mar. 15, 2005

(86) PCT No.: PCT/EP2005/051152
§ 371 (c)(1),
(2), (4) Date: Sep. 19, 2006

(87) PCT Pub. No.: WO2005/091662
PCT Pub. Date: Sep. 29, 2005

(65) Prior Publication Data
US 2007/0207776 A1 Sep. 6, 2007

(30) Foreign Application Priority Data
Mar. 19, 2004 (DE) .................. 10 2004 013 658

(51) Int. Cl.
*H04K 1/00* (2006.01)
(52) U.S. Cl.
USPC ............ 380/247; 380/43; 380/267; 455/411; 455/434; 370/410
(58) Field of Classification Search
USPC ................. 380/247, 43; 375/220; 370/352, 370/338; 455/411, 434
See application file for complete search history.

(56) References Cited

U.S. PATENT DOCUMENTS

| | | | | |
|---|---|---|---|---|
| 5,537,474 A | * | 7/1996 | Brown et al. ............... | 380/248 |
| 5,794,139 A | * | 8/1998 | Mizikovsky et al. ......... | 455/403 |
| 6,690,930 B1 | * | 2/2004 | Dupre ......................... | 455/411 |
| 6,707,915 B1 | * | 3/2004 | Jobst et al. .................. | 380/247 |
| 6,985,519 B1 | * | 1/2006 | Barnes et al. ............... | 375/220 |

(Continued)

FOREIGN PATENT DOCUMENTS

| | | |
|---|---|---|
| JP | 2002-247654 | 8/2002 |
| RU | 2 111 621 C1 | 5/1998 |

(Continued)

OTHER PUBLICATIONS

"3rd Generation Partnership Project; Technical Specification Group Core Network; Mobile radio interface signaling layer 3; General aspects (Release 5)", 3GPP TS 24.007, V5.4.0, 2005, pp. 1-140.
Ala-Laurila, et al., "Wireless LAN Access Network Architecture for Mobile Operators"; IEEE Communications Magazine, vol. 39, Issue 11, Nov. 2001, p. 82-89.

(Continued)

*Primary Examiner* — Allahyar Kasraian
(74) *Attorney, Agent, or Firm* — Staas & Halsey LLP

(57) ABSTRACT

A bit sequence, which is contained in a signalling message and which is known to a network unit and to a communications terminal which receives the signalling message from the network unit, informs the communications terminal that a test value is contained in a signalling message. The test value received by the communications terminal is compared with a test value computed by the communications terminal, and the communications terminal defines a signalling message as being unmodified only in the event that the bit sequence contained in a signalling message has been received and the comparison of both test values yields a positive result.

13 Claims, 2 Drawing Sheets

U.S. PATENT DOCUMENTS

| | | | |
|---|---|---|---|
| 7,065,340 B1 * | 6/2006 | Einola et al. | 455/410 |
| 2002/0012433 A1 | 1/2002 | Haverinen et al. | |
| 2002/0044552 A1 | 4/2002 | Vialen et al. | |
| 2003/0218532 A1 * | 11/2003 | Hussmann | 340/5.8 |
| 2004/0037320 A1 | 2/2004 | Dickson | |
| 2005/0111666 A1 * | 5/2005 | Blom et al. | 380/277 |
| 2005/0125663 A1 * | 6/2005 | Funk | 713/168 |
| 2006/0050671 A1 * | 3/2006 | Kim | 370/338 |
| 2006/0050680 A1 * | 3/2006 | Naim et al. | 370/352 |
| 2007/0207776 A1 * | 9/2007 | Zaus | 455/411 |

FOREIGN PATENT DOCUMENTS

| | | |
|---|---|---|
| WO | 02/43424 A1 | 5/2002 |
| WO | 02/069560 A1 | 9/2002 |
| WO | 03/036908 | 5/2003 |
| WO | 03/090433 A1 | 10/2003 |

OTHER PUBLICATIONS

Vodaphone; "Cipher Key Separation for A/Gb Security Enhancements"; 3GPP TSG SA WG3 Security; Jul. 2003; pp. 1-2.

Krawczyk, et al.; "HMAC: Keyed-Hashing for Message Authentication"; Network Work Group; RFC 2104; Feb. 2001; pp. 1-11.

Postel, "User Datagram Protocol"; Internet Engineering Task Force; RFC 768; Aug. 1980; pp. 1-3.

Universal Mobile Telecommunications Systems (UMTS); 3G Security; Security architecture; 3GPP TS 33.102 version 5.3.0 Release 5; ETSI Standards; Sep. 2003; pp. 1-62.

International Search Report for PCT Application No. PCT/2005/051152; mailed Jun. 30, 2005.

\* cited by examiner

PROTOCOL EXPANSION OF A SIGNALING MESSAGE

CROSS REFERENCE TO RELATED APPLICATIONS

This application is based on and hereby claims priority to German Patent Application No. 10 2004 013 658.0 filed on Mar. 19, 2004, the contents of which are hereby incorporated by reference.

BACKGROUND

A method and a device for detecting a modification in a signaling message sent from a network unit to a communications terminal are described below.

In a communications network, in particular a mobile radio system of the second and third generation such as a GSM network and a UMTS network, the network units (mobile service switching center [MSC] or serving General Packet Radio Service (GPRS) support node [SGSN]) exchange signaling messages with the communications terminal.

A new wireless LAN architecture for combining WLAN access network technology, SIM-based user management functions and the roaming infrastructure of the network operators is known from Ala-Laurila, J., et al.: Wireless LAN access network architecture for mobile operators: IEEE Communications Magazine, Volume 39, Issue 11, November 2001, pages 82-89. In the system described, WLAN access is authenticated and charged for using a GSM-SIM card.

Postel, J.: RFC 768: User Datagram Protocol: Internet Engineering Task Force (IETF), 28 Aug. 1980 (accessible on the Internet) describes a user datagram protocol (UDP) for packet-switching computer communication in a computer network. The UDP protocol is based on the Internet Protocol (IP) and provides for a procedure for applications for sending messages to other programs with minimal protocol mechanisms.

Techniques for transmitting packets from a transmission unit via a wireless communications system to a receiver unit are known from Document D3 (2004/0037320 A1). In this case data frames contained in a packet are received. One or more headers are generated for the packet for one or more protocols in the protocol field. Possible protocols here are RTP, UDP, IP, PPP, RLP and variants.

A method for transmitting a message to a plurality of terminals in a network using a multicast service is known from Document D4 (WO 03/036908 A1), the multicast message being encrypted and simultaneously sent to several terminals.

Because the radio interface between a base station and communications terminal or mobile radio device in principle offers many opportunities for attackers, an attacker using a so-called "false base station" can position himself between a communications terminal and a real base station. The false base station acts here toward the communications terminal as a base station and toward the real base station as a communications terminal. By falsifying the messages exchanged between communications terminal and network units the false base station can for example ensure that a mobile radio call is encrypted using a cryptographically weaker method and hence can be eavesdropped on more easily.

A method for protecting against falsifications of messages is realized in the UMTS network in accordance with 3GPP TS 33.102, Universal Mobile Telecommunications System (UMTS); 3G security; Security architecture, Release 5.3.0 (2003 Oct. 10, 2003), chapter 6.3.

When the mobile radio device logs on to the communications network for the first time, an authentication procedure is carried out in which the mobile radio device authenticates itself to the communications network and a secret temporary key IK is agreed between mobile radio device and communications network.

To this end a signed response (SRES) is computed in the communications network or mobile radio network in a special network unit, the authentication center (AuC), from the user's secret key Ki and a random number RAND using a function f2K (RAND, Ki), as is a temporary secret key using another function f4K (RAND, Ki). RAND, SRES and IK are then sent to the switching center MSC or to the serving GPRS support node SGSN, to which the mobile radio device is currently connected. Finally the MSC or the SGSN sends the random number RAND to the mobile radio device in an authentication request message. The signed response (SRES) and the temporary secret key IK are computed in the mobile radio device from the RAND and the secret key Ki using the functions f2K (RAND, Ki) and f4K (RAND, Ki).

Then the mobile radio device returns the value SRES to the communications network in an authentication response message. The MSC or the SGSN compares this value with the value computed by the authentication center AuC. If both match, the mobile radio device is deemed to be successfully authenticated. Simultaneously the mobile radio device and communications network have generated a temporary secret key IK using this procedure.

For all signaling messages exchanged between the mobile radio device and communications network after the authentication procedure, the sender of the message in each case computes a test value Hash (message, IK) using the secret key IK. The test value Hash (message, IK) is computed using the temporary key IK, because the secret key Ki may in general never leave the authentication center. The test value is then transmitted with the message and is checked by the mobile radio device. If the message has been modified by a false base station, the mobile radio device will in general recognize this from the fact that the test value is no longer correct, because the false base station does not know the secret key IK and hence cannot compute the test value for the modified message.

However, this method was introduced for a UMTS network from the outset, in other words from the first protocol version. The mobile radio device hence knows that the messages must contain a test value. A distinction as to whether the mobile radio device is located in an "old network" (message does not contain a test value) or in a "new network" (message must contain a test value) is hence not necessary.

A similar suggestion was made for the GSM system: in this case a test value was to be added to the authentication request message as a new message element. A false (fraudulent) base station can however falsify the message (e.g. for the purpose of eavesdropping) in such a way that it removes the test value and forwards the message to the mobile radio device in the old format. The problem of how the mobile radio device can recognize that it is located in a new network was not solved by this suggestion. A further suggestion (3GPP TSG SA WG3 Security, Cipher key separation for A/Gb security enhancements, file S3-030463, 15-18 Jul. 2003, San Francisco, USA, Agenda point 7.5, Source: Vodafone) for the GSM system is based on the fact that the false base station must not modify the value of the RAND parameter in the authentication request message because otherwise the mobile radio device computes a false SRES value and the authentication procedure does not succeed.

According to this suggestion a specially established bit sequence is entered in the first 32 bits of the RAND parameter, the bit sequent indicating to the mobile radio device that a particular item of information is being transmitted in the following n bits of the RAND parameter. (The standardization article S3-030463 specifically suggests encoding in the next 8 bits which GSM cipher algorithms are permissible in the network and which are not. This should prevent the false base station being able to manipulate messages on the radio interface to the mobile radio device so that a cryptographically weaker cipher algorithm is selected.)

The special bit sequence is required because this protocol expansion is not supported from the outset by all networks. The longer the special bit sequence, the lower the probability that a communications network that does not yet support the protocol expansion randomly selects the special bit sequence during the selection of a RAND parameter and the mobile radio device then erroneously interprets the additional bits in the RAND parameter as information. For 32 bits this probability is for example $1:2^{32} \cong 1:4 \times 10^9$.

Generally the following requirements for a solution to a problem must be satisfied:
i) A communications terminal or a mobile radio device that likewise supports the protocol expansion should notice any falsification of the authentication request message in new networks (UMTS networks, etc.) that support the protocol expansion.
ii) The communications terminal or the mobile radio device should however also work in old networks (GSM networks, etc.) that do not yet support the protocol expansion. Naturally the communications terminal or mobile radio device cannot then recognize message falsifications.
iii) The communications terminal or the mobile radio device must be able to recognize whether it is located in an old or a new network, particularly if a false base station is attempting to feign an "old network" to it.

The term "retrospective protocol expansion" should thus be understood as meaning that in a version "n" of the signaling protocol the message is not yet protected against falsifications, whereas as of version "n+1" of the protocol it is protected. The new version "n+1" should here be downward-compatible with the predecessor version "n". One possible falsification by a false base station could for example be that the new message elements are simply omitted. The mobile radio device then assumes that it is located in a network using protocol version "n".

A problem entailed with the method suggested in S3-030463 (3GPP TSG SA WG3 Security, Cipher key separation for A/Gb security enhancements, 15-18 Jul. 2003, San Francisco, USA, agenda point 7.5, Source: Vodafone) is that the information to be protected is embedded in the RAND parameters, in other words the more such information is added over time, the fewer bits can in fact be randomly selected by the communications network. This tends to weaken the authentication function f2K (RAND, Ki). Also, because of the length of the RAND parameter (16 bytes in the GSM and UMTS network), an upper limit obtains for the quantity of information that can be protected in this way.

SUMMARY

An aspect can be seen as suggesting a possibility for efficient and simple recognition of a modification of a signaling message.

One key element can be seen in that in order to recognize a modification in a signaling message sent from a network unit to a communications terminal a bit sequent known to a network unit and the communications terminal in a sent signaling message (authentication request) specifies that a test value is contained in a signaling message (authentication request; additional message). The signaling message containing the test value can here be an authentication request message or a subsequent further message or signaling message. After the receipt of this message the test value received by the communications terminal is compared with a test value computed by the communications terminal. The communications terminal, which is for example a mobile radio device, a mobile computer, a mobile organizer, etc. then defines a signaling message (authentication request; additional message) as unmodified if the bit sequence was received in a signaling message (authentication request) and the comparison of the two test values yields a positive result. The special bit sequence itself is protected during transmission in an appropriate manner, so that modifications by a false base station are noticed by the communications terminal or by the network unit. Ideally the special bit sequence is contained in the RAND parameter. Thanks to the special bit sequence in the RAND parameter the communications terminal can very reliably recognize whether the communications network supports the protocol expansion of the signaling message. If the false base station modifies the RAND parameter in order to feign an "old" network to the communications terminal, this is noticed by the network unit, in particular by a switching center MSC or by a serving GPRS support node SGSN, because the authentication procedure fails. A further advantage is that by using a suitable test value the quantity of information that can be protected is no longer limited in advance. If new message elements are added to the signaling message, these can automatically also be taken into account when computing the test value. New message elements can also still be added in later protocol versions. Additionally, the authentication function f2K (RAND, Ki) is weakened less because only the bit sequence in the signaling message is embedded in the RAND parameter, but not the other message elements to be protected. The potential for variation in the case of the RAND parameter is bigger as a result. Optionally all subsequent signaling messages can also be protected by a test value. This results in more efficient protection against any attackers using "false base stations".

BRIEF DESCRIPTION OF THE DRAWINGS

These and other objects and advantages will become more apparent and more readily appreciated from the following description of an exemplary embodiment, taken in conjunction with the accompanying drawings of which.

DETAILED DESCRIPTION OF THE PREFERRED EMBODIMENT

Figure 1:
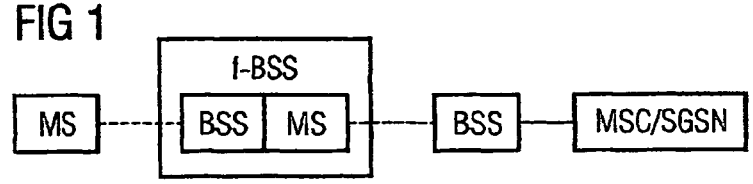
FIG. 1 is a block diagram of a network architecture with a "false" base station.

Reference will now be made in detail to the preferred embodiments, examples of which are illustrated in the accompanying drawings, wherein like reference numerals refer to like elements throughout.

FIG. 1 shows a network architecture of a mobile radio network with a "false base station" f-BSS positioned between a communications terminal or mobile radio device MS and a base station BSS. The false base station here acts toward the mobile radio device MS like a base station BSS, and toward the real base station BSS like a mobile radio device MS. By falsifying the messages exchanged between mobile radio device MS and network element MSC/SGSN the false base station f-BSS can for example ensure that a mobile radio call is encrypted using a cryptographically weaker method and hence can more easily be eavesdropped on. A network unit MSC/SGSN here can be a switching center MSC or a serving GPRS support node SGSN.

Figure 2:
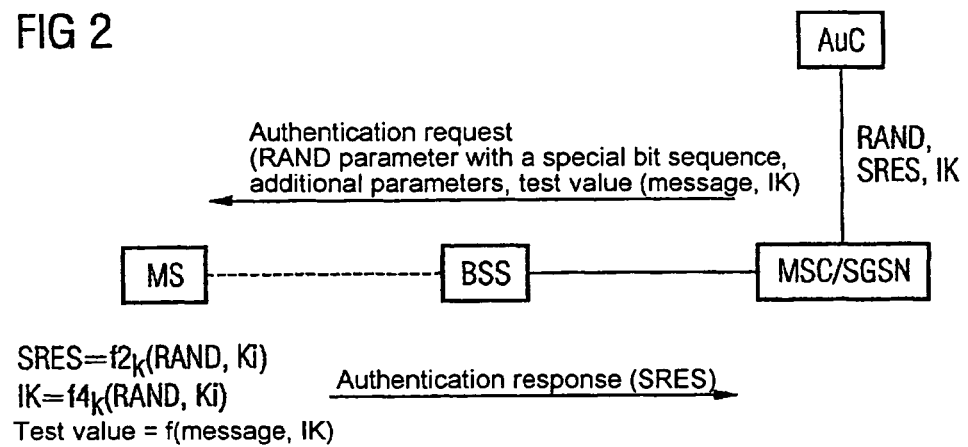
FIG. 2 is a block diagram of a simplified network architecture for implementing the method disclosed herein.

FIG. 2 shows a simplified illustration for implementing the method. As already described, a "signed response" (SRES) is computed in the communications network, in this case a mobile radio network, in a special network unit, the authentication centerAuC, from the user's secret key Ki and a random number RAND, using a function f2K (RAND, Ki), as is a temporary secret key IK using a further function f4K (RAND, Ki). RAND, SRES and IK are then, depending on the mobile radio network used (GSM network, UMTS network, etc.) sent to the network unit MSC/SGSN (switching center MSC or serving GPRS support note SGSN) to which the mobile radio network MS is currently connected. The switching center MSC or the serving GPRS support node SGSN finally sends the random number parameter RAND, a test value generated by the network unit MSC/SGSN and other parameters to the mobile radio network MS with a signaling message "authentication request". The RAND parameter contains a special bit sequence that is known to both the mobile radio device and to the network unit MSC/SGSN and is protected against modification by, for example, a "false base station". The protection arises from the communications terminal MS computing different values, in the event of the bit sequence being modified by an attacker with a "false base station", from the values (test value, SRES, etc.) computed in the network unit MSC/SGSN and in this being detectable by the network unit MSC/SGSN for example at the time of the authentication response. The authentication center AuC could also select and use a bit sequence for the dispatch between the network unit MSC/SGSN and the communications terminal MS from at least two bit sequences known to both the network unit MSC/SGSN and the communications terminal MS. RAND parameters with a special bit sequence should in general only be generated by the authentication center AuC when it is known that the communications network in which the communications terminal MS or the mobile radio device MS is currently located supports the protocol expansion, in other words if the network unit MSC/SGSN is able to compute the test value and also send it with the authentication request message. As suggested in S3-030463 (3GPP TSG SAWG3 Security Cipher key separation for A/Gb security enhancements, 15-18 Jul. 2003, San Francisco, USA, agenda point 7.5, Source: Vodafone), this can be solved in the case of roaming—in other words if the user does not remain in his home communications network—by the authentication center AuC comparing the identity of the mobile radio network (or of the switching center MSC or the serving GPRS support node SGSN) to which the parameters RAND, SRES and IK must be sent, with a list showing which communications networks support the protocol expansion. The test value "Hash" f(message, IK) is determined by the network unit MSC/SGSN from the contents of the signaling message and the key IK.

The "signed response" (SRES) and the temporary secret key IK are computed in the mobile radio device MS from the RAND parameter and the secret key Ki using the functions f2K (RAND, Ki) and f4K (RAND, Ki). Thanks to the special bit sequence in the RAND parameter of the signaling message "authentication request" the mobile radio device MS is notified that a test value "Hash" f(message, IK) must be contained in the signaling message. The special bit sequence could of course also be contained in another parameter if it is ensured that the mobile radio device MS or the network unit MSC/SGSN can recognize a modification of the parameter by a false base station. The communications terminal MS or the mobile radio device MS then computes its own test value "Hash" f(message, IK), which is computed from the contents of the message and the temporary secret key IK, and compares the computed test value with the test value contained in the signaling message. If the test value is missing, although the RAND parameter contains the special bit sequence, or if the test value sent at the same time does not match the one (equivalence of the two test values) which the mobile radio device MS computes itself, it is assumed that the message has been falsified en route from the network unit MSC/SGSN to the mobile radio device MS. When dispatching the signaling message from the network unit MSC/SGSN to the communications terminal MS, several communications networks can also be involved, as for example in the case of an inter-communications network handover.

Then, in order to conclude the authentication, the mobile radio device MS sends the signaling message "authentication response" with the SRES parameter computed by the mobile radio device MS to the network unit MSC/SGSN.

Figure 3:
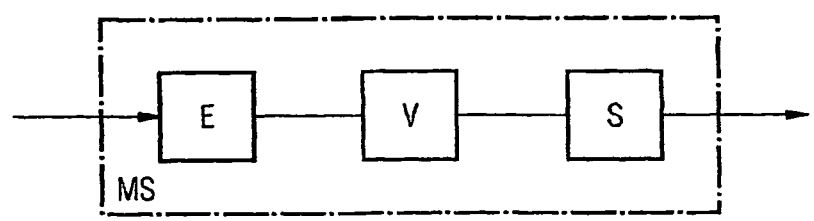
FIG. 3 is a block diagram of a communications terminal for receiving a signaling message from a network unit.

FIG. 3 shows an illustration of a communications terminal MS for receiving a signaling message from a network unit MSC/SGSN. The communications terminal MS possesses, for mobile communications, in particular for mobile communications using a mobile radio network, a receiver unit E and a transmitter unit S. A processing unit V can recognize on the basis of a special bit sequence in the signaling message, in particular in the RAND parameter, that a test value "Hash" f(message, IK) must be contained in the signaling message. The communications terminal MS or the mobile radio device MS then computes its own test value "Hash" f(message, IK), that is computed from the contents of the message and the temporary secret key IK, and compares the computed test value with the test value contained in the signaling message. The communications terminal MS does not define the signaling message as unmodified unless the comparison of the two test values yields a positive result. A result is regarded as positive if the two test values are identical. In one variation, the special bit sequence is used to signal that all following messages in the communications network in which the communications network is currently located, which are sent from the communications network or from the network unit MSC/SGSN to the communications terminal MS, must contain a test value.

Figure 4:
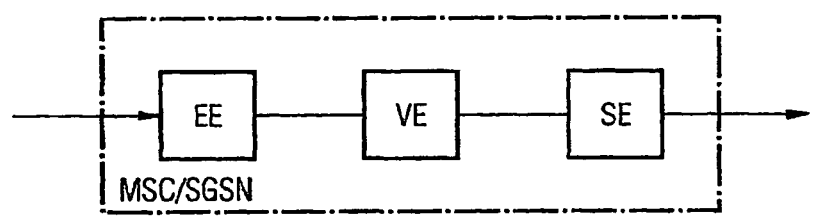
FIG. 4 is a block diagram of a network unit disclosed herein.

FIG. 4 shows a simplified illustration of a network unit MSC/SGSN that can be used to implement the method described above. The network unit MSC/SGSN contains, for mobile communications, in particular for mobile communications using a mobile radio network, a receiver unit EE and a transmitter unit SE. A processing work [sic] VE receives parameters from an authentication center AuC in accordance with FIG. 2 and determines a test value "Hash" f(message, IK) which it (VE) sends to a connected communications terminal MS in a signaling message together with other parameters.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV,* 358 F3d 870, 69 USPQ2d 1865 (Fed. Cir. 2004).

The invention claimed is:

1. A method for detecting a modification in a signaling message sent from a network unit to a communications terminal, comprising:
    transmitting the signaling message from the network unit to the communications terminal, the signaling message including a bit sequence known to the network unit and the communications terminal and indicating to the communications terminal that a test value is contained in at least one signaling message, the bit sequence being sent to the communications terminal in a RAND parameter with the signaling message;
    comparing a received test value received by the communications terminal with a computed test value computed by the communications terminal; and
    designating at the communications terminal when the bit sequence is received in the signaling message, that the at least one signaling message is unmodified if said comparing of the received and computed test values produces a positive result,
    wherein the bit sequence is sent to the communications terminal in a RAND parameter with the at least one signaling message such that only the bit sequence of the at least one signaling message is embedded in the RAND parameter.

2. The method as claimed in claim 1, wherein the bit sequence is sent to the communications terminal in an authentication request message.

3. The method as claimed in claim 1, wherein the bit sequence is protected against modification during transmission.

4. The method as claimed in claim 3, wherein the test value is determined from the signaling message contents and a key value.

5. The method as claimed in claim 4, wherein the signaling message containing the bit sequence is a single signaling message that also contains the test value.

6. The method as claimed in claim 5, wherein the bit sequence and the test value are sent to the communications terminal from the network unit in at least two different signaling messages.

7. The method as claimed in claim 6, wherein the positive result of said comparing occurs if the received and computed test values are equivalent.

8. The method as claimed in claim 7, wherein the bit sequence in the signaling message is selected from at least two different bit sequences.

9. The method as claimed in claim 8, wherein the network unit sends the signaling message to the communications terminal via at least one communications network.

10. The method as claimed in claim 9, wherein the at least one communications network includes a mobile radio network.

11. The method as claimed in claim 10, wherein the network unit is at least one of a switching center and a serving General Packet Radio Service support node.

12. The method as claimed in claim 11, wherein the communications terminal is at least one of a mobile radio terminal, a mobile computer and a mobile organizer.

13. A communications terminal for detecting a modification in a signaling message sent from a network unit via at least one communications network, comprising:
    a receiving unit receiving signaling messages via the communications network; and
    at least one processing unit checking whether a bit sequence sent to the communications terminal in a RAND parameter and known to the network unit and to said communications terminal is contained in a signaling message indicating that a test value is contained in at least one signaling message, computing a computed test value, comparing a received test value with the computed test value, and defining the at least one signaling message as unmodified if the comparing of the received and computed test values produces a positive result,
    wherein the bit sequence is sent to the communications terminal in a RAND parameter with the at least one signaling message such that only the bit sequence of the at least one signaling message is embedded in the RAND parameter.

* * * * *